United States Patent [19]
Otto

[11] 3,858,950
[45] Jan. 7, 1975

[54] SEALED BEARING

[75] Inventor: Dennis L. Otto, Malvern, Ohio

[73] Assignee: The Timken Company, Canton, Ohio

[22] Filed: Feb. 26, 1973

[21] Appl. No.: 335,511

[52] U.S. Cl................ 308/187.1, 277/95, 308/36.1, 308/187.2
[51] Int. Cl. .............................................. F16c 1/24
[58] Field of Search............ 308/187.1, 187.2, 36.1; 277/27, 95

[56] References Cited
UNITED STATES PATENTS

| | | | |
|---|---|---|---|
| 2,878,084 | 3/1959 | Bermingham | 308/187.1 |
| 3,006,701 | 10/1961 | Curtis | 308/187.1 |
| 3,159,407 | 12/1964 | Strohm | 277/95 |
| 3,361,497 | 1/1968 | Stengel | 308/187.2 |
| 3,510,182 | 5/1970 | Cowles | 308/187.2 |
| 3,627,391 | 12/1971 | Bingle | 308/187.2 |
| 3,639,016 | 2/1972 | Bourgeois | 308/187.2 |
| 3,748,003 | 7/1973 | Barber | 308/187.2 |

FOREIGN PATENTS OR APPLICATIONS

| | | | |
|---|---|---|---|
| 1,139,430 | 7/1957 | France | 308/187.1 |

*Primary Examiner*—Charles J. Myhre
*Assistant Examiner*—R. H. Lanaus
*Attorney, Agent, or Firm*—Gravely, Lieder & Woodruff

[57] ABSTRACT

A tapered roller bearing has an elastomeric seal bonded to the thrust rib of its cone, and this seal is provided with a primary sealing lip which extends toward and engages the front face of the bearing cup. At its end the primary sealing lip has three beveled surfaces which are oriented to form two sealing edges. One edge is directed axially and contacts the cup front face, while the other edge is directed radially and is normally set slightly inwardly from the housing bore into which the cup fits. The radially directed edge properly locates the axially directed edge and is further provided with notches. When high internal pressures develop in the bearing, the primary sealing lip moves outwardly, causing the axially directed edge to move away from the cup front face and the radially directed edge to engage the housing bore. The vent notches relieve the high internal pressures. The seal is bonded to the cone in a mold having sections which seat against the cone back face and the inside face of the thrust rib.

4 Claims, 6 Drawing Figures

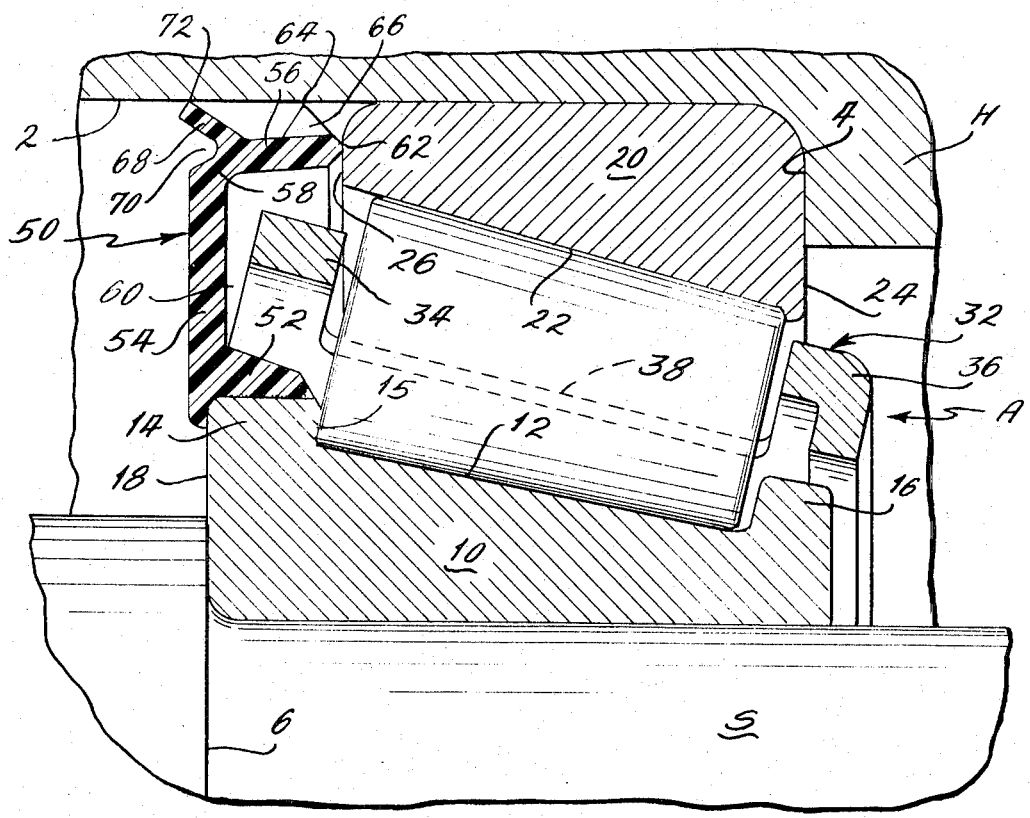
FIG.1
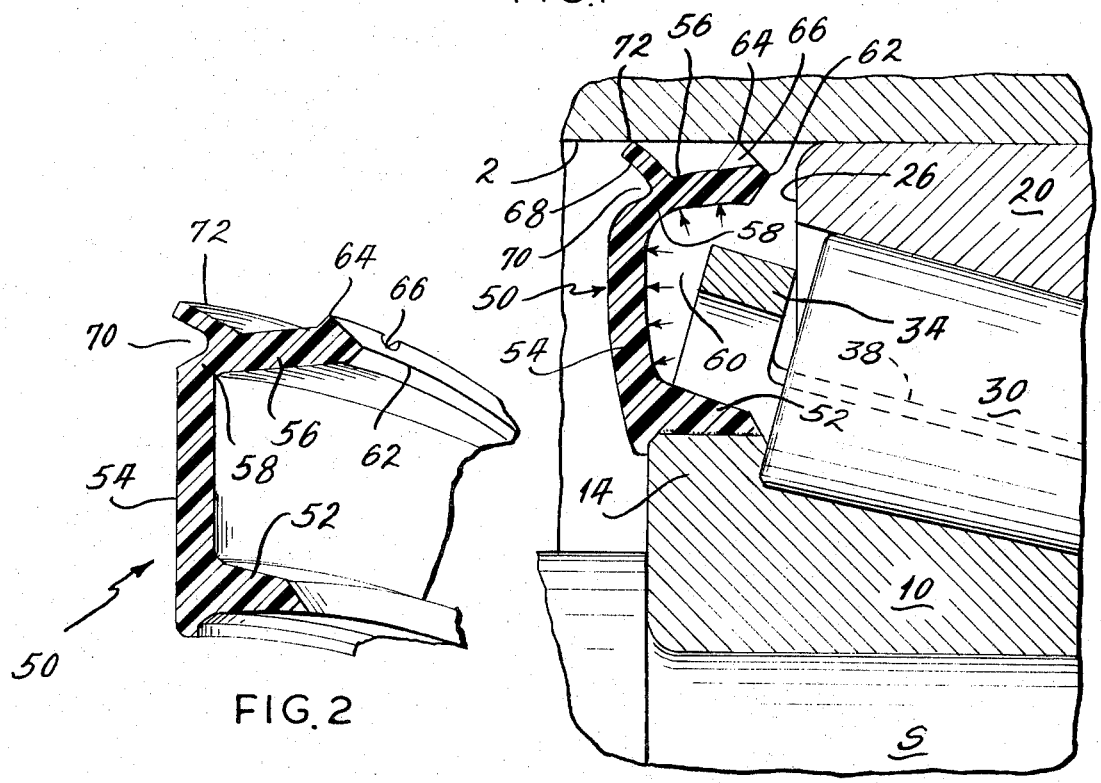
FIG.2
FIG.3

SEALED BEARING

BACKGROUND OF THE INVENTION

This invention relates in general to bearings and, more particularly, to sealed antifriction bearings.

Antifriction bearings must be operated in the presence of a lubricating medium which is usually grease, for otherwise the rotating rolling elements of such bearings will generate excessive heat and cause bearing failure. This is true of a tapered roller bearing, since the end faces at the large diameter ends of the tapered rollers slide along the cone thrust rib which serves to position the rollers. To prevent lubricants from leaving their interiors, antifriction bearings are usually provided with seal assemblies.

The typical seal assembly includes a stamped metal case which is fitted to one of two members between which a bearing is disposed. An elastomeric seal is bonded to the metal case and this seal usually has a lip which engages the other of the two members between which the bearing is mounted. For example, the metal case may be press fitted into the housing bore in which the outer race of a bearing is contained, while the seal embraces a shaft carried by the inner race of the bearing.

In a more compact sealing arrangement used with tapered roller bearings, the elastomeric seal is bonded to a stamped metal insert which is press fitted over the thrust rib at the large diameter end of the bearing cone. A primary seal lip on the seal engages the front face of the cup, while a secondary seal lip engages the housing bore into which the cup is fitted. Such a sealing arrangement is disclosed in U.S. Pat. No. 3,006,701.

The presence of metal inserts is the seal assemblies of the compact variety illustrated in U.S. Pat. No. 3,006,701 increases the cost of manufacturing the seal assemblies and further increases the cost of assembling the bearings. In particular, special equipment is necessary to stamp the insert, more equipment is necessary to bond the elastomeric seal to the insert, and still more is necessary to press the seal assembly onto the cone thrust rib. Also, close tolerances must be held in the stamping operation by which the insert is formed and in the machining operation in which the final shape of the cone is determined so that the proper interference fits will exist between the cone thrust rib and the insert. To this end, the outside face of the cone thrust rib must be ground to within precise tolerances and hence special cones are required for use with such seal assemblies.

Despite precautions taken during manufacture, the possibility always exists that the insert will fit too loosely on the cone thrust rib, in which case slippage will occur. Also, a loose fitting seal assembly increases the possibility of leakage along the thrust rib, and the chances of the seal moving into a position where optimum sealing does not occur is also increased. Moreover, the possibility always exists that the seal will be misaligned during assembly, in which case it will not seal properly. Furthermore, in molding to a stamped insert, sometimes the molding pressure deforms the insert to the extent that the seal edges are not concentric with it. This results in a poor sealing surface. Finally, the insert may be pressed too far across the thrust rib, and in that case the seal lip will be excessively distorted or will even interfere with the rotating bearing cage.

Aside from the foregoing, in compact seal assemblies current design, the seals have wide sealing faces which generate considerable heat and increase seal drag. Also, such seals do not accommodate high internal pressures very well. In this regard, the internal pressure within a bearing may increase due to the heat generated during operation or due to additional lubricants being supplied during relubrication. Indeed, such seals have been known to invert or turn inside out during careless attempts at relubrication.

One of the principal objects of the present invention is to eliminate the stamped metal insert presently used in seal assemblies by bonding the elastomeric seal directly to bearing races. Another object is to provide a highly compact sealed bearing at minimum expense. A further object is to provide a sealed bearing in which the seal is mounted on one of the races and no leakage or slippage occurs between the seal and that race. An additional object is to provide a compact seal assembly which does not create excessive seal drag or heat. Still another object is to provide a sealed bearing which may be relubricated without turning the seal lip inside out. A further object is to provide a bearing of the type stated in which the seal lips are precisely positioned and are truely concentric to the axis of rotation for the bearing. Yet another object is to provide a process for bonding an elastomeric seal to a machined and hardened bearing race. These and other objects and advantages will become apparent hereinafter.

The present invention is embodied in a bearing having an elastomeric seal bonded directly to one of the races thereof. The invention also resides in the process for bonding the seal to the bearing race. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a half sectional view of a sealed bearing constructed in accordance with and embodying the present invention;

FIG. 2 is a fragmentary perspective view of the seal;

FIG. 3 is a sectional view showing the seal of the bearing when subjected to a high internal pressure;

DETAILED DESCRIPTION

Figure 4:
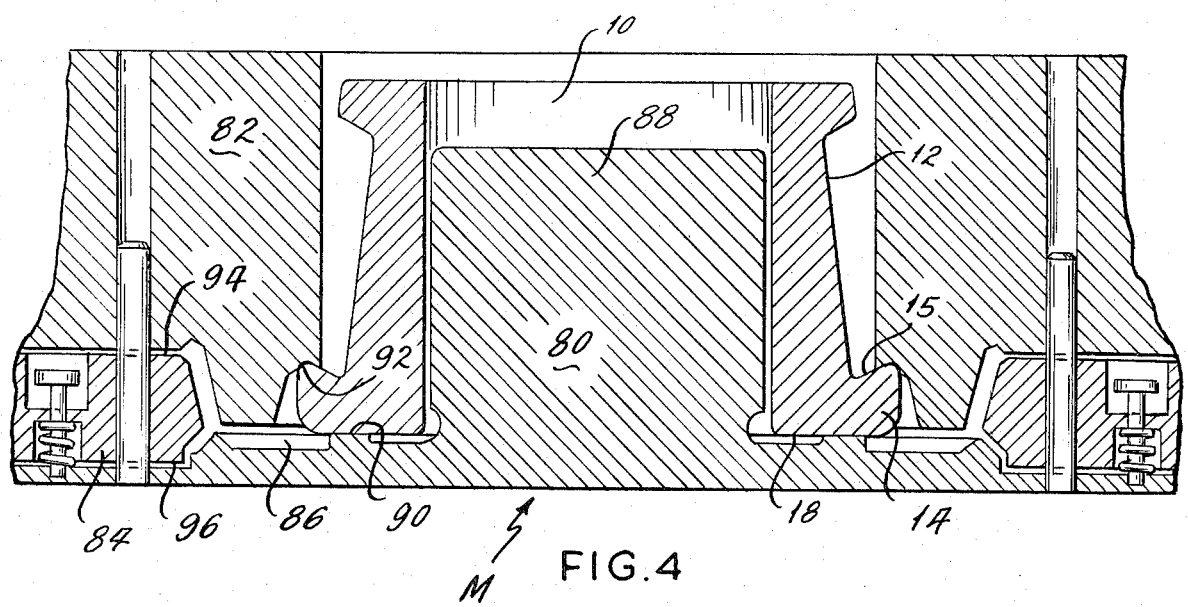
FIG. 4 is a sectional view of a mold used to form the seal and bond it to the cone.

Referring now to the drawings (FIG. 1), A designates a sealed bearing of the tapered roller variety, and that bearing is interposed between a bearing housing H and a shaft S to enable one to rotate relative to the other. Actually, the bearing is fitted into a housing bore 2 which terminates at a shoulder 4. The shaft is also provided with a shoulder 6 which is axially offset from the shoulder 4.

The bearing A includes a cone or inner race 10 (FIG. 1) provided with an outwardly presented tapered raceway 12. At the large diameter of its raceway 12 the cone 10 has an integrally formed thrust rib 14 provided with a cylindrical outer surface and a ground inside face 15 located adjacent to the end of the raceway 12. At its small diameter end the cone 10 has an integrally formed retaining rib 16. The thrust rib 14 terminates at a cone back face 18 which is case hardened and ground square to axis of rotation for the bearing A. The cone 10 fits over the shaft S with its back face 18 abutting the shaft shoulder 6. The thrust rib 14, however, projects outwardly beyond the shaft shoulder 6.

The bearing A also includes a cup or outer race 20 (FIG. 1) having an inwardly presented tapered raceway 22 which is presented opposite to the cone raceway 12. At its small diameter end the tapered raceway 22 intersects the cup back face 24 which is case hardened and ground perpendicular to the axis of rotation. The cup back face 24 abuts the shoulder 4 at the end of the housing bore 2. At its large diameter end the cup raceway 22 intersects the cup front face 26 which is also case hardened and ground perpendicular to the axis of rotation. The cup front face 26 is axially offset from the cone back face 18, it being located almost directly outwardly from the large diameter end of the cone raceway 12.

In addition to the cone 10 and the cup 20, the bearing A also has a plurality of tapered rollers 30 (FIG. 1) which are interposed between the cone 10 and cup 20 and are engaged with the tapered raceways 12 and 22 thereof. The large diameter ends of the rollers 30 abut the ground inside face 15 of the thrust rib 14 so that the thrust rib 14 serves to axially position the rollers 30. As the cup 20 rotates relative to the cone 10 or vice-versa, the rollers 30 will roll along the tapered raceways 12 and 22 and the large diameter end faces of those rollers 30 will more or less slide along the inside face of the thrust rib 14. In any event, true rolling contact does not exist between the end faces of the rollers 30 and the inside face 15 of the thrust rib 14, and to prevent excessive friction from developing at this location, the bearing A must contain an adequate supply of lubrication.

The proper circumferential spacing is maintained between adjacent rollers by a cage 32 (FIG. 1) which further holds the rollers 30 against the cone when the cone 10 is withdrawn from the cup 20. The cage 32 is a one-piece metal stamping and includes a large diameter annular band 34 which is located outwardly from the thrust rib 14 and extends across the large diameter ends of the rollers 30, a small diameter annular band 36 which is located outwardly from the retention rib 16 and extends across the small diameter ends of the rollers 30, and bridges 38 which interconnect the bands 34 and 36 to form roller pockets in the cage 32. The rollers 30 fit into the roller pockets so formed and hence the bridges 38 extend between adjacent rollers 30. The bridges 38 are located outwardly from the axial centerlines of the rollers 30 and have chamferred side faces which conform generally tangentially to the contour of the side faces on the rollers 30. The corresponding distance between adjacent bridges 38 is such that the rollers 30 are prevented from leaving the cone 10 when the cone 10 is withdrawn from the cup 20.

Aside from the foregoing components, all of which are conventional with tapered roller bearings of current design and manufacture, the sealed bearing A also includes a seal 50 (FIGS. 1 and 2) which is bonded to the thrust rib 14 of the cone 10 and engages the front face 26 of the cup 20 to form a barrier at that end of the bearing A at which the large diameter ends of the rollers 30 are disposed. The barrier retains the lubricants in the interior of the bearing A and excludes water, dirt, and other contaminants therefrom. More specifically, the seal 50 is formed entirely from a suitable elastomer and includes an annular base 52 which extends over and is bonded to the entire outside or cylindrical surface of the thrust rib 14 on the cone 10. The base 52 further extends over the corner separating the cylindrical face and the cone back face 18 and is bonded to the cone back face 18 adjacent the periphery thereof (FIG. 1). The base 52 covers only a very small area of the cone back face 18 and is located outwardly from the shaft S so that a metal-to-metal abutment exists between the cone back face 18 and the shaft shoulder 6. The base 52 does not extend onto the ground inside face 15 of the thrust rib 14, that is the face against which the large diameter ends of the rollers 30 bear. Directly outwardly from the cone back face 18, the base 52 merges into a web 54 which may be of uniform thickness, and that thickness is substantially less the axial dimension of the base 52. The outer or exposed end surface of the web 54 is coplanar with the end of the base 52, and that surface is offset from the back face 18 of the cone 10. The web 54, in turn, merges into a primary sealing lip 56 at a connecting portion 58, and the primary sealing lip 56 extends in the same direction as the base 52, but is spaced outwardly therefrom so that an annular cavity 60 is created between the base 52 and primary sealing lip 56. The cavity 60 opens into the interior of the bearing A and accommodates the large diameter band 34 on the end of the cage 32 (FIG. 1).

The primary sealing lip 56 at its free end, that is the end remote from the reduced connecting portion 58, has three bevelled surfaces which are disposed such that two sealing edges 62 and 64 (FIGS. 1 and 2) are created on the end of the primary lip 56. The first sealing edge 62 is located directly at the end of the primary lip 56 and projects axially, substantially from the center of the lip 56. This edge 62 engages the front face 26 of the cup 20. The other sealing edge 64 is offset axially from the edge 62 and is directed radially outwardly toward the surface of the housing bore 2. However, during normal operation of the bearing A the edge 64 is set slightly inwardly from the cylindrical surface of the housing bore 2 so that no friction develops along it (FIG. 1). Nevertheless, it serves to correctly position the axial edge 62. The radial sealing edge 64 is relieved or interrupted at three or more locations where it is provided with vent notches 66. (FIG. 2)

At the connecting portion 58, the primary lip 56 merges into a secondary lip 68 (FIGS. 1 and 2) which extends generally in the opposite direction outwardly toward the surface of the housing bore 2 at an angle oblique to the axis of rotation. The secondary lip 68 generally encircles the end of the web 54 and is separated therefrom by a laterally opening groove 70 which creates the reduced connecting portion 58. The secondary lip 68 terminates at a sealing edge 72 which engages the cylindrical surface of the housing bore 2. The primary lip 56 retains lubricants within the interior of the bearing A, while the secondary lip 68 excludes water and other contaminants therefrom.

In operation, the housing H rotates relative to the shaft S or vice-versa and, of course, relative rotation likewise occurs between the cup 20 and cone 10 of the bearing A. During the relative rotation the tapered rollers 30 roll along the raceways 12 and 22, while the large diameter end faces of the rollers 30 more or less slide along the inwardly presented face 15 of the thrust rib 14. Thus, it is important to maintain a lubricant film between the end faces of the rollers 30 and the inside face 15 of the thrust rib 14. The lubricant is usually a grease, and is retained in the bearing interior by the seal 50. In particular, no grease escapes along the cone 10 since the base 52 of the seal 50 is bonded directly to the thrust rib 14 of the cone 10. Similarly, leakage at the cup 20 is reduced to an absolute minimum since the axially directed sealing edge 62 on the primary lip 56 of the seal 50 engages the ground front face 26 on the cup 20. In this connection, it should be noted that some of the lubricant will work under the sealing edge 62, and perhaps escape, but this is desirable since it places a thin film of lubricant between the sealing edge 62 and the cup front face 26. This thin film of lubricant reduces friction and thereby reduces seal drag and the heat generated through the effects of friction. The reduced heat in turn prolongs the life of the seal 50. The radially directed sealing edge 64 of the primary lip 56 normally does not engage anything and hence does not impede the relative rotation. However, only a slight clearance exists, and should the lip 56 deform or deviate from its proper position, the radial edge 64 will keep the axial edge 62 located properly with respect to the cup front face 26. The sealing edge 72 on the secondary lip 68 engages the cylindrical surface of the housing bore 2 and prevents water, dirt, and other contaminants from entering the interior of the bearing A.

Since the seal 50 is bonded directly to the cone 10, its positioning is determined during manufacture of the bearing itself and not during a subsequent assembly operation as is true of bearings provided with metal inserts. Hence, the seal 50 is positioned such that the proper amount of deflection is imparted to the web 54 when the primary lip 56 engages the front face 26. Also, the seal 50 will maintain the proper position and will not slip or move out of position during operation. Since only line or edge contact exists between the primary sealing lip 56 and the cup front face 26 and likewise between the secondary sealing lip 68 and the surface of the housing bore 2, seal drag and the heat generated thereby, are kept at a minimum.

Also, since the seal 50 is bonded directly to the cone 10 instead of an insert, the cost of the insert and the cost of pressing it onto the bearing are eliminated, thus providing a substantial savings in the cost of the overall assembly. Finally, it should be noted that the cone 10 may be manufactured without maintaining precise tolerances on the outside surface of the thrust rib 14, and hence the outside surface of the thrust rib need not be ground. This permits conventional cones to be used for the bearing A, instead of specially ground cones, as is true of those sealed bearings using stamped inserts.

The bearing A normally constitutes one of two indirectly mounted bearings between the housing H and the shaft S and sometimes the housing H or for that matter even the shaft S is provided with a lubrication channel which opens into the space between the two bearings. The bearings A are relubricated by forcing grease through this channel, and the grease displaces air from the interior of the bearing.

After the bearing A fills with grease, the grease enters the annular cavity 60 of the seal 50 and lifts the primary lip 56 outwardly (FIG. 3). This causes the axial sealing edge 62 to back away from the cup front face 26 and brings the radial sealing edge 64 into engagement with the cylindrical surface of the housing bore 2. The grease and displaced air will then pass through the space between the sealing edge 62 and the cup front face 26 and thence through the vent notches 66. Eventually, the displaced air and excess grease force the obliquely directed secondary lip 68 outwardly and leaves the bearing A. Grease exuding from the bearing A indicates that it is completely full. After the relubrication has been completed and the bearing A is again set in operation, the seal 50 will revert to its original shape and position, in which case the axial edge 62 on the primary lip 56 will bear against the cup front face 26 and the radial edge 64 will be located slightly inwardly from the surface of the housing bore 2 (FIG. 1).

High internal pressures resulting from the heat generated during operation are relieved in a like manner.

The foregoing accomodation of high internal pressures contrasts with conventional bearing seals of the compact variety. Conventional seals have no means for venting excess grease and as a result the high pressure distorts the seal, and in the case of relubrication the grease can actually invert the primary lip of the seal so that it becomes lodged against the surface of the housing bore 2 and hence turns away from the cup front face 26. When such a bearing is again put in operation excessive seal drag develops and the seal is usually destroyed.

The seal 50 is both formed and bonded to the cone 10 in a mold M (FIG. 4) which may have a lower mold section 80, an upper mold section 82 which may be withdrawn from the lower section 80, and a core 84 which may be separated from both the lower section 80 and the upper section 82. The two sections 80 and 82 and the core 84 all fit together to define a mold cavity 86 having the shape of the seal 50. The lower section 80 is further provided with a locating boss 88 over which the cone 10 will fit when the upper section 82 is withdrawn from the lower section 80, and this boss locates the cone 10 in the radial direction. In addition, the lower section 80 has a seat 90 against which the cone back face 18 bears, thus locating the cone 10 in the axial direction. Once the cone 10 and the core 84 are correctly positioned on the lower section 80, the upper section 82 is lowered toward the lower section 80 until a seat 92 adjacent to the inside surface thereof bears against the inside face 15 of the cone thrust rib 14, which is the face against which the rollers 30 bear. The core 84 is urged upwardly by springs and when the mold M is closed it is spaced vertically from both of the sections 80 and 82. These spaces form flash lines 94 and 96 leading from sealing edges 64 and 72, respectively.

Prior to placing the cone 10 on the lower mold section 82, the cone 10 is phosphate coated to prepare it for bonding cement which is subsequently applied only on those surface areas to which the seal is to be bonded, and those areas are the cylindrical surface of the thrust rib 14 and a small portion of the cone back face 18 adjacent to the cylindrical surface. The remaining areas are masked to prevent the bonding cement and elastomer from adhering to those areas. The mold sections 80 and 82 and the core 84 are then heated to the molding temperature and so is the cone 10 which is thereafter placed over the locating boss 88 of the lower mold section 80. Next uncured elastomeric material is placed in that portion of the mold cavity 86 defined by the lower mold section 80 and the upper mold section 82 is closed upon the lower mold section 80 until its seat 92 bears against the inside face of the thrust rib 14. This also forces the core 84 downwardly toward the lower section 80 and against its spring load. As the core 84 and upper section close upon the lower section 80 the elastomeric material assumes the configuration of the mold cavity 86 and the excess elastomeric material exudes through the flash lines 94 and 96, carrying off impurities as it closes.

The closed mold M is held at the cure temperature for a prescribed time and is then opened. After the cone 10 with the seal 50 bonded to it is removed from the mold M, the flash is torn from the sealing edges 64 and 72.

After the seal 50 is bonded to the cone 10, the rollers 30 and cage 32 are assembled on the cone 10. The assembly procedure is somewhat different than the conventional procedure for assembling rollers and cages on cones due to the presence of the seal 50 on the cone 10. By way of background, it should be noted that after cages are stamped the bridges are bowed outwardly in the vicinity of the small diameter annular band so that the rollers can be passed between the inwardly presented surface of the small diameter annular band and the outwardly presented surface of the retaining rib on the cone. Thereafter, the bridges are driven inwardly toward the cone raceway. The closure is effected by driving the cage into a tapered die cavity with the outwardly bowed cage bridges engaged with the tapered walls of the cavity. The driving force is applied against the large diameter band at the end of the cage. The foregoing conventional procedure cannot be utilized with the cone 10 since the seal 50 obstructs the end of the large diameter band 34.

Figure 5:
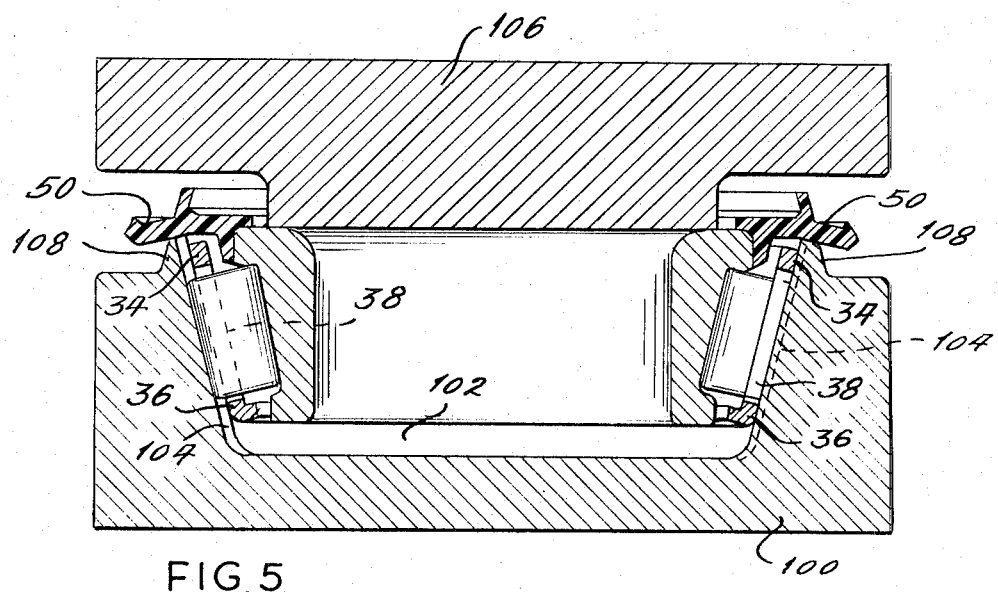
FIG. 5 is a sectional view of a device used to close the cage of the bearing.

To assemble the rollers 30 and cage 32 on the cone 10, the cage 32 with its bridges 38 bowed outwardly in the vicinity of the small end diameter annular band 36 is placed over the cone 10 and the rollers 30 are inserted between the inwardly presented surface or the small diameter annular band 36 and the outwardly presented surface of the retaining rib 16 on the cone 10. Then the cone 10 with the rollers 30 and cage 32 around it are fitted into a closing die 100 (FIG. 5) having a tapered die cavity 102 and grooves 104 of arcuate cross-section opening into the die cavity 102. Actually, the cone 10 with the rollers 30 and cage 32 about it are fitted into the die cavity 102, and when so fitted the grooves 104 receive rollers 30, while the outwardly bowed bridges 38 engage the tapered surfaces between the grooves 104. Once the cone 10, rollers 30, and cage 32 are properly positioned in the die cagity 102, a press ram 106 is brought against the cone back face 18 and drives the cone 10 further into the cavity 102. The axial force applied to the cone 10 by the ram 106 is transmitted to the rollers 30 through the thrust rib 14 and thence through the rollers 30 to the small diameter band 36 of the cage 32. Thus, as the cone 10 is driven into the tapered die cavity 102 so too are the rollers 30 and the cage 32. As the outwardly bowed bridges 38 on the cage 32 pass over the tapered sides of the die they are driven inwardly and becomes straight. This decreases the width of the roller pockets and once the bridges 38 are straight, the cage-roller set cannot be separated from the cone 10. The die 100 is provided with a lip 108 at the upper end of the die cavity 102 for displacing the primary sealing lip 56 outwardly so it does not become lodged between the tapered wall of the cavity and the large diameter band 34 on the cage 32.

Figure 6:
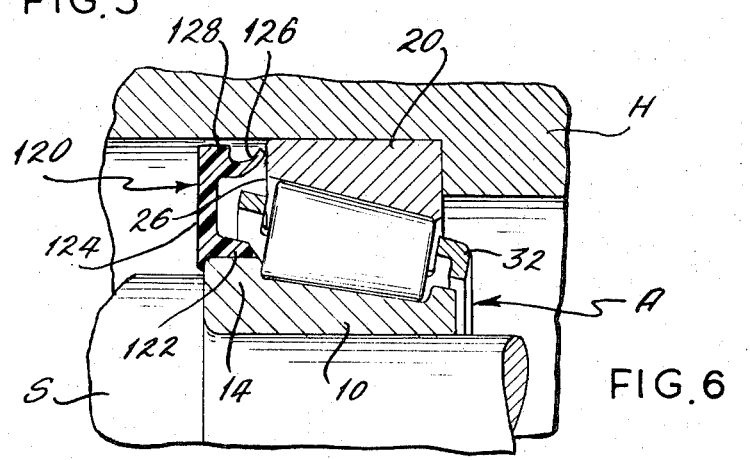
FIG. 6 is a half sectional view of the bearing provided with a modified seal.

In lieu of the seal 50, the bearing A may be provided with a modified seal 120 (FIG. 6) which is likewise bonded to the cone 10. The seal 120 includes a base 122 which is bonded to the cylinderical surface of the thrust rib 14 as well as to a small area of the cone back face 18. The base 122 merges into a web 124 which in turn merges into a sealing lip 126 and a dirt excluder 128. The sealing lip 126 is spaced outwardly from, yet encircles the base 122 so that an annular cavity 130 exists between the two. This cavity accommodates the large diameter band 34 on the end of the cage 32. The end of the sealing lip 126 engages the front face 26 of the cup 20. The dirt excluder 128 possesses substantial width and projects directly outwardly from the web 124, but its wide outwardly presented surface is set slightly inwardly from the housing bore 2. Thus, the sealing lip 126 maintains lubricants within the interior of the bearing A, while the dirt excluder 128 excludes most contaminants. The seal 120 creates less seal drag than the seal 50, and hence can be used in applications requiring higher speed.

This invention is intended to cover all changes and modifications of the example of the invention herein chosen for purposes of the disclosure which do not constitute departures from the spirit and scope of the invention.

What is claimed is:

1. A sealed tapered roller bearing for use between a shaft and a housing having a bore therein; said bearing comprising: a cup sized to fit in the housing bore and having an inwardly presented tapered raceway and a front face at the large diameter end of the tapered raceway; a cone sized to fit over the shaft and having an outwardly presented tapered raceway located opposite the cup raceway, the cone further having a thrust rib located at and projecting beyond the large diameter end of the cone raceway; tapered rollers interposed between the cup and cone and having their tapered side faces engaged with the tapered raceways and their large diameter end faces abutting against the thrust rib; and an elastomeric seal having a base extended over and bonded directly to the thrust rib of the cone, a primary sealing lip engaged with the front face of the cup, and an outwardly directed web interposed between and connected to the base and the primary sealing lip, the primary sealing lip extending generally axially from the web toward the cup front face and having a first sealing surface engaged with the cup front face and a second sealing surface presented toward, but normally set slightly inwardly from the housing bore, the second sealing surface being adapted to engage the housing bore upon yielding of the elastomeric seal as the result of an increase in pressure within the bearing, whereby a barrier to the passage of lubricants is created across the space between said cup and cone.

2. A bearing according to claim 1 wherein the second sealing surface is interrupted by at least one vent notch to vent the interior of the bearing when the second sealing surface is against the housing bore.

3. A bearing according to claim 2 wherein the first and second sealing surfaces are edges formed by the intersection of a plurality of end faces on the primary lip.

4. A bearing according to claim 1 wherein the seal is further characterized by a secondary lip connected to the primary lip near the connection of the primary lip to the web and extended obliquely away from the primary sealing lip in generally the opposite direction, the secondary lip being engaged with the housing bore.

* * * * *